United States Patent
Bahns et al.

(10) Patent No.: US 10,196,594 B2
(45) Date of Patent: Feb. 5, 2019

(54) DEVICE AND METHOD FOR EXTRACTING AROMA SUBSTANCES FROM VEGETABLE AROMA CARRIERS INTO A BREWING LIQUID

(71) Applicant: GEA Brewery Systems GmbH, Kitzingen (DE)

(72) Inventors: Patrick Bahns, Kitzingen (DE); Rudolf Michel, Kitzingen (DE); Ludwig Scheller, Kitzingen (DE)

(73) Assignee: GEA BREWERY SYSTEMS GMBH, Kitzingen (DE)

( * ) Notice: Subject to any disclaimer, the term of this patent is extended or adjusted under 35 U.S.C. 154(b) by 143 days.

(21) Appl. No.: 14/940,911

(22) Filed: Nov. 13, 2015

(65) Prior Publication Data

US 2016/0145550 A1    May 26, 2016

(30) Foreign Application Priority Data

Nov. 20, 2014  (EP) ...................................... 14194031
Feb. 3, 2015   (DE) ......................... 10 2015 101 518

(51) Int. Cl.
*C12C 3/08*     (2006.01)
*C12C 7/28*     (2006.01)
(Continued)

(52) U.S. Cl.
CPC ............ *C12C 3/085* (2013.01); *A23L 3/3544* (2013.01); *C12C 7/205* (2013.01); *C12C 7/24* (2013.01);
(Continued)

(58) Field of Classification Search
CPC ........... C12C 3/085; C12C 7/205; C12C 7/24; C12C 11/11; C12C 13/00; C12C 7/287
(Continued)

(56) References Cited

U.S. PATENT DOCUMENTS 3,291,308 A * 12/1966 Headrick ................ C02F 1/004
                                                210/101
3,407,722 A    10/1968 Huppmann
(Continued)

FOREIGN PATENT DOCUMENTS

DE    4111879        10/1992
DE    19960146 A1    6/2001
(Continued)

OTHER PUBLICATIONS

Banke Friedrich, Device, useful in a brewing system for extracting aromatic compounds; Aug. 14, 2014; Espacenet; 18-page.*
(Continued)

*Primary Examiner* — Dana Ross
*Assistant Examiner* — Kuangyue Chen
(74) *Attorney, Agent, or Firm* — Quarles & Brady LLP

(57) ABSTRACT

A device for extracting aroma substances from vegetable aroma carriers into a brewing liquid, in particular into beer, includes a fluidized bed extractor accommodating a suspension bed including the brewing liquid and solid particles contained in aroma carriers. The fluidized bed extractor has at least an inlet and an outlet for the brewing liquid. A feed pump pumps the brewing liquid from the inlet through the fluidized bed extractor to the outlet. A feeding speed of the feed pump is set to a value at which an average vertical feeding speed of the brewing liquid in the fluidized bed extractor is lower than an average vertical sedimentation speed of the solid particles in the fluidized bed extractor.

8 Claims, 9 Drawing Sheets

(51) Int. Cl.
*C12C 7/20* (2006.01)
*C12C 7/24* (2006.01)
*C12C 11/11* (2006.01)
*C12C 13/00* (2006.01)
*A23L 3/3544* (2006.01)

(52) U.S. Cl.
CPC .............. *C12C 7/287* (2013.01); *C12C 11/11* (2013.01); *C12C 13/00* (2013.01)

(58) Field of Classification Search
USPC ............................................ 99/278; 426/600
See application file for complete search history.

(56) References Cited

U.S. PATENT DOCUMENTS

| | | | | |
|---|---|---|---|---|
| 3,782,551 | A * | 1/1974 | Soldan | C12C 7/14 210/179 |
| 4,994,392 | A * | 2/1991 | Welledits | C12C 7/06 126/351.1 |
| 5,976,463 | A * | 11/1999 | Nomura | A61M 1/3621 422/45 |
| 7,615,155 | B1 | 11/2009 | Hansen et al. | |
| 2007/0039479 | A1* | 2/2007 | Dalton | A47J 31/0663 99/279 |
| 2009/0285971 | A1* | 11/2009 | Broderick | C12C 7/065 426/627 |
| 2013/0126424 | A1 | 5/2013 | Bugay | |
| 2013/0202736 | A1 | 8/2013 | Reeves | |
| 2016/0083678 | A1* | 3/2016 | Welledits | C12C 7/04 426/520 |

FOREIGN PATENT DOCUMENTS

| | | | |
|---|---|---|---|
| DE | 102010049719 | 4/2012 | |
| DE | 102013101435 A1 * | 8/2014 | ............... C12C 7/24 |
| DE | 102013004562 | 9/2014 | |
| EP | 0011870 A1 | 6/1980 | |
| EP | 0508344 | 10/1992 | |
| EP | 1106679 A1 | 6/2001 | |
| EP | 2206770 A2 | 7/2010 | |
| EP | 2388066 A1 | 11/2011 | |
| EP | 2500408 A1 | 9/2012 | |
| WO | 2007078195 A1 | 7/2007 | |
| WO | 2010054712 A1 | 5/2010 | |
| WO | 2010059211 A2 | 5/2010 | |
| WO | 2013104911 A2 | 7/2013 | |
| WO | 2013181422 A1 | 12/2013 | |
| WO | 2014178711 A1 | 11/2014 | |

OTHER PUBLICATIONS

Bohnke, et al., Anaerobtechnik: Handbuch der anaeroben Behandlung von Abwasser und Schlamm [English Translation: Anaerobic Method: Handbook on the Anaerobic Treatment of Wastewater and Sludge], Published by Springer Verlag, Berlin, 1993, English Language Abstract Included.

Mitter, et al., Wiederbelebtes Verfahren—Die Kalthopfung [English Translation: Revived Method—Dry Hopping], Journal: Brauindustrie, 2012, Issue No. 4, pp. 10-12, English Language Abstract Included.

Narziss, Die Technologie der Wurzebereitung [English Translation: The Technology of Wort Production], 7th Edition, Published by Ferdinand Enke Verlag Stuttgart, 1992, English Language Abstract Included.

Schonberger, et al., Die Kunst der Kalthopfung [English Translation: The Art of Dry Hopping], Yearbook: Der Doemensianer, Jan. 2013, Issue No. 1, pp. 42-43, English Language Abstract Included.

* cited by examiner

DEVICE AND METHOD FOR EXTRACTING AROMA SUBSTANCES FROM VEGETABLE AROMA CARRIERS INTO A BREWING LIQUID

CROSS-REFERENCE TO RELATED APPLICATIONS

This application claims priority to European Patent Application No. 14 194 031.2 filed on Nov. 20, 2014 and German Patent Application No. 10 2015 101 518.8 filed on Feb. 3, 2015, both of which are fully incorporated herein by reference.

STATEMENT REGARDING FEDERALLY SPONSORED RESEARCH OR DEVELOPMENT

Not applicable.

FIELD OF THE INVENTION

The present invention relates to a device for extracting aroma substances from vegetable aroma carriers, in particular from solid hop products such as hop pellets, into a brewing liquid. The invention further relates to a method for extracting aroma substances from vegetable aroma carriers into a brewing liquid.

BACKGROUND OF THE INVENTION

Generic devices and methods are employed in the brewing of beer to separate solids of hop products when hopping the wort and the beer, which may take place at any stage during beer production. This so-called aroma hopping may take place by way of the hot brewing liquid as so-called boil hopping or also after fermentation in the finished beer as so-called dry hopping.

In beer production, hop is added to the wort during wort production. This is also called boil hopping. In this case, it is one of the tasks of the hop to add a bitter flavor and hop aroma to the beer. Customarily, hop pellets, which contain solids, or hop extract or also natural hop is used for this purpose. In case of hopping in the boiling process, i.e. during the brewhouse process, the hop is usually added during wort boiling. To bring out the hop aroma, the hop may also be added after hot trub separation, i.e. after the whirlpool and prior to the wort cooler. In this way, the volatile hop aromas are prevented from evaporating and dissipating.

Based on changing customer demands, beer with a strongly pronounced hop aroma is increasingly sought in the market. To achieve said aroma, the beers are increasingly also dry-hopped. This means that hop is added to the beer at the cold stages, preferably after fermentation. This is called dry-hopping. Hop pellets or natural hops are most commonly used for this purpose.

The use of solid hop products, in particular hop pellets, for example, is disadvantageous both at the hot stages and at the cold stages in particular because after extraction of the ingredients, large amounts of residue, so-called spent hops or hop trub particles, remain in the wort and in the beer. These solid residues have to be separated again because they are undesired in the subsequent processes and in the finished beer.

At the hot stages, in case of hop addition during wort boiling, said separation subsequently takes place in the whirlpool, in the wort receiver or by means of a centrifuge, where the hop trub particles are separated together with the protein residue, namely the hot trub.

In order to achieve proper separation, the whirlpool has to have a sufficiently large separating area so as to be able to receive and separate the hop trub. In case of beers with large amounts of hop, the whirlpool vessels will have to be dimensioned correspondingly larger, which leads to additional investment costs as well as to higher losses of wort.

During hopping, the hop trub is separated by filtration or separation, which, however, causes additional costs because the additional trub particles tend to considerably reduce the capacity and performance of the filter and because it becomes necessary to invest in a (potentially custom-built) centrifuge. Also, part of the hop trub particles may lie in the tank in a very compact manner, making them difficult to remove.

From DE 10 2013 101 435 A1, a device and a method for extracting aroma substances from vegetable aroma carriers into a brewing liquid are known. Either a hydrocyclone or a filter, in particular a slotted filter, is used as a solids separating device for separating the insoluble hop trub particles. The use of a hydrocyclone has the disadvantage that adjustment of the capacity of said hydrocyclone to the respectively necessary capacity for hop trub separation is very intricate. Since the hydrocyclone is based on complex flow-mechanical operating principles, the dimensions of the hydrocyclone cannot be easily adjusted depending on the respectively necessary capacity for hop trub separation. The use of a filter for hop trub separation has the disadvantage that these filters, in particular sieve filters, are easily clogged and will have to be laboriously cleaned for continued use.

SUMMARY OF THE INVENTION

Therefore, the object of the present invention is to propose a new device and a new method for extracting aroma substances from vegetable aroma carriers, in particular hop products, into a brewing liquid, by means of which the above-described disadvantages of known solids separating devices, namely those of a hydrocyclone and of a slotted filter, are avoided. This object is attained by a device and by a method according to the teachings herein.

The inventive device described herein is based on the idea that a fluidized bed extractor is used as the solids separating device. The fluidized bed extractor is based on the principle of accommodating a corresponding vessel holding a suspension of the brewing liquid, such as the beer and the solid particles of the aroma carrier finely distributed therein. During operation of the fluidized bed extractor, brewing liquid flows through the fluidized bed extractor starting from an inlet through the suspension bed forming at the bottom of the fluidized bed extractor toward an outlet. The flow of brewing liquid through the fluidized bed extractor is maintained by operation of a feed pump. The feeding speed of the feed pump is set to a value at which the average vertical feeding speed of the brewing liquid in the fluidized bed extractor is lower than the average vertical sedimentation speed of the solid particles. Through this speed difference, it is achieved that the solid particles separate from the liquid portion and are retained in the suspension bed when the brewing liquid is being fed through the fluidized bed extractor. At the same time, the direct contact of the brewing liquid with the aroma carriers causes the soluble components of the aroma substances to be released from the aroma carriers.

If the brewing liquid contains alcohol, in particular by use of fully fermented beer, the process of release of the soluble aroma substances from the aroma carriers can be significantly accelerated and increased. The capacity of the fluidized bed extractor can be very easily adjusted to the device capacity required in each case because continuous scaling of the flow capacity can be achieved by simply enlarging the cross-section of the vessel that is used as the fluidized bed extractor. Since separation of the solids from the liquid in the fluidized bed extractor is based solely on the physical difference of the respective flow speeds of the liquid on the one hand and the sedimentation speed of the insoluble solids on the other hand, clogging of this solids separating device is precluded in principle.

If the device is used for hopping wort or beer, the manner in which the hop is added is basically optional. Generally, the hop can be added as natural hop, as hop powder, as hop pellets or also as hop extract. If the hop is chosen to be added as pellets, the hop pellets can be added directly into the fluidized bed extractor through a filling opening according to a preferred embodiment of the device. The hop pellets consist of compressed hop particles, which themselves are produced in turn by grinding the natural hop. To extract the aroma substances, it is necessarily required for the hop pellets to be crushed or broken up without clumps prior to the actual fluidized bed extraction so that a fine suspension of brewing liquid and hop particles can be formed. To make said crushing of the hop pellets possible, the feeding direction of the feed pump can be repeatedly switched after addition of the brewing liquid into the hop extractor in order to feed the brewing liquid through the fluidized bed extractor in the respectively opposite feeding direction. Because of the cyclically reversing flow, the hop pellets will be dissolved in the brewing liquid and form a fine suspension of brewing liquid and hop particles.

In view of a suspension of brewing liquid and hop particles that is as fine as possible, a drivable mixing means, in particular a jet mixer or a shear stirrer, can be additionally arranged in the fluidized bed extractor. By driving said mixing means, it is possible to facilitate and accelerate crushing of the hop pellets.

To prevent aroma carriers from blocking the outlet duct during filling of the extractor, it is particularly advantageous if a permeable support element, in particular a sieve bottom, is provided in the fluidized bed extractor. During and after filling of the fluidized bed extractor with the aroma carriers, the dry aroma carriers can be deposited on the support element, precluding undesired compacting and blocking processes. Only when filling the fluidized bed extractor with the brewing liquid, the aroma carriers are completely soaked and crushed in the brewing liquid.

The separating capacity of the fluidized bed extractor is limited with respect to very fine solid particles because an increasingly fine separation of solid particles requires a very large speed difference between the flow speeds of the brewing liquid on the one hand and the sedimentation speed of the solid particles on the other hand. To still achieve an appropriately high purity of the brewing liquid at an acceptable flow speed of the brewing liquid through the fluidized bed extractor, it may thus be advantageous if a fine filter device, in particular a backflushable corner pipe filter, for separating fine particles of the aroma carrier from the brewing liquid is connected downstream of the outlet of the fluidized bed extractor. The fine filter device provides the user with the option of adjusting the respectively desired quality of filtration also with respect to fine and very fine solid particles independently of the operation of the fluidized bed extractor.

If a fine filter device is provided, it is particularly advantageous if a bypass duct is provided in the device parallel to the fine filter device so as to be able to bypass the fine filter device if necessary. The device according to the invention will preferably be used in the fermentation and storage cellar of a brewery for dry hopping of the beer stored in the tanks. To be able to easily hop the beer stored in the different tanks by means of the device according to the invention, it is particularly advantageous if the device is arranged on a transportable, in particular mobile frame and can be connected to a fermentation tank by means of corresponding connections. Thus, the user will be able to roll the device to individual tanks as needed in each case and to perform the appropriate aroma after-treatment.

To ensure the necessary speed difference between the sedimentation speed of the hop particles on the one hand and the flow speed of the brewing liquid on the other hand, it is particularly advantageous if the feeding rate of the feed pump in the device according to the invention can be controlled.

The inventive method described herein for extracting aroma substances from vegetable aroma carriers into a brewing liquid is based on the method idea that first a suspension of the brewing liquid and of the solid particles of the aroma carrier is formed. This may take place in a separate buffer vessel, for example. The suspension is subsequently introduced into a fluidized bed extractor, where a suspension bed forms. When brewing liquid continues to flow through the fluidized bed extractor, the aroma carrier will be leached in that the aroma substances are released and on the other hand the solids of the aroma carrier will be separated from the brewing liquid. If the dry aroma carriers are directly added into the fluidized bed extractor, formation of the suspension, i.e. the first method step, entirely or in part, can also take place directly in the fluidized bed extractor so that the formation of the suspension and the introduction of the suspension into the fluidized bed extractor take place simultaneously.

To form the required suspension of aroma carrier particles and brewing liquid when using hop pellets, the brewing liquid can be pumped through the fluidized bed extractor in alternating flow directions so that the hop pellets thus dissolve into the hop particles that were compressed during production of the pellets.

To remove fine components of the aroma carrier from the brewing liquid, a fine filter device can be used according to the invention, the brewing liquid previously reduced in terms of solids flowing through said filter device after separation of the solids in the fluidized bed extractor.

According to a preferred variant of the method, it is envisaged in method step c) that the brewing liquid from a vessel or tank, in particular namely beer from a fermentation or storage tank, is used. Said brewing liquid from the tank can then be fed through the fluidized bed extractor in a circulating manner until the desired degree of leaching of the aroma carriers is reached. When the terms storage vessel, vessel or tank are mentioned hereinafter, these terms are to be used as synonyms. Fermentation tank and storage tank are to be used as synonyms as well.

If in method step c) the brewing liquid from a storage vessel is used and is fed through the fluidized bed extractor in a circulating manner, it is particularly advantageous if the brewing liquid is collected in said vessel after method step c) and is circulated so as to eliminate any concentration differences to the rest of the tank content. As a result, it can be achieved in this way that the aroma concentration of the brewing liquid contained in the vessel is substantially the same everywhere in the vessel.

The manner in which aroma carriers are introduced to the method is basically optional. The use of hop pellets is particularly advantageous.

The type of brewing liquid used for the method is also basically optional. For example, the use of wort is conceivable, too. A particularly high yield is achieved when using alcoholic brewing liquids because the soluble hop components contain oils and can thus be solubilized particularly well in alcohol. If alcoholic beer is used for the method, it can be both matured beer and beer that is still fermenting. A brewing liquid low in yeast is ideal for the process because yeast is capable of binding hop components, thus keeping them unavailable for the further process. In practice, low-yeast beer from the storage tank has proved to be best.

To prevent undesired oxidation processes, it is particularly advantageous in all variants of the method according to the invention if the fluidized bed extractor is filled with an inert gas prior to being filled with aroma carriers and brewing liquid. This prevents the ambient oxygen from coming into direct contact with aroma carriers and with the brewing liquid and triggering undesired oxidation processes.

To achieve a highest possible raw material yield, it is particularly advantageous in all variants of the method according to the invention if the fluidized bed extractor and/or the feed ducts connected to the fluidized bed extractor are pressure-emptied with water after the desired degree of leaching has been reached. By pressing water in, the brewing liquid located there with the aroma substances dissolved therein can be displaced and can continue to be used in subsequent process stages. Ideally, the water is so-called deaerated water, which has a very low oxygen content. Basically, however, any kind of water may be used.

A device and a method according to the present invention are schematically illustrated in the drawings and will be explained in more detail in the following paragraphs.

DETAILED DESCRIPTION OF THE EXAMPLE EMBODIMENTS

Figure 1:
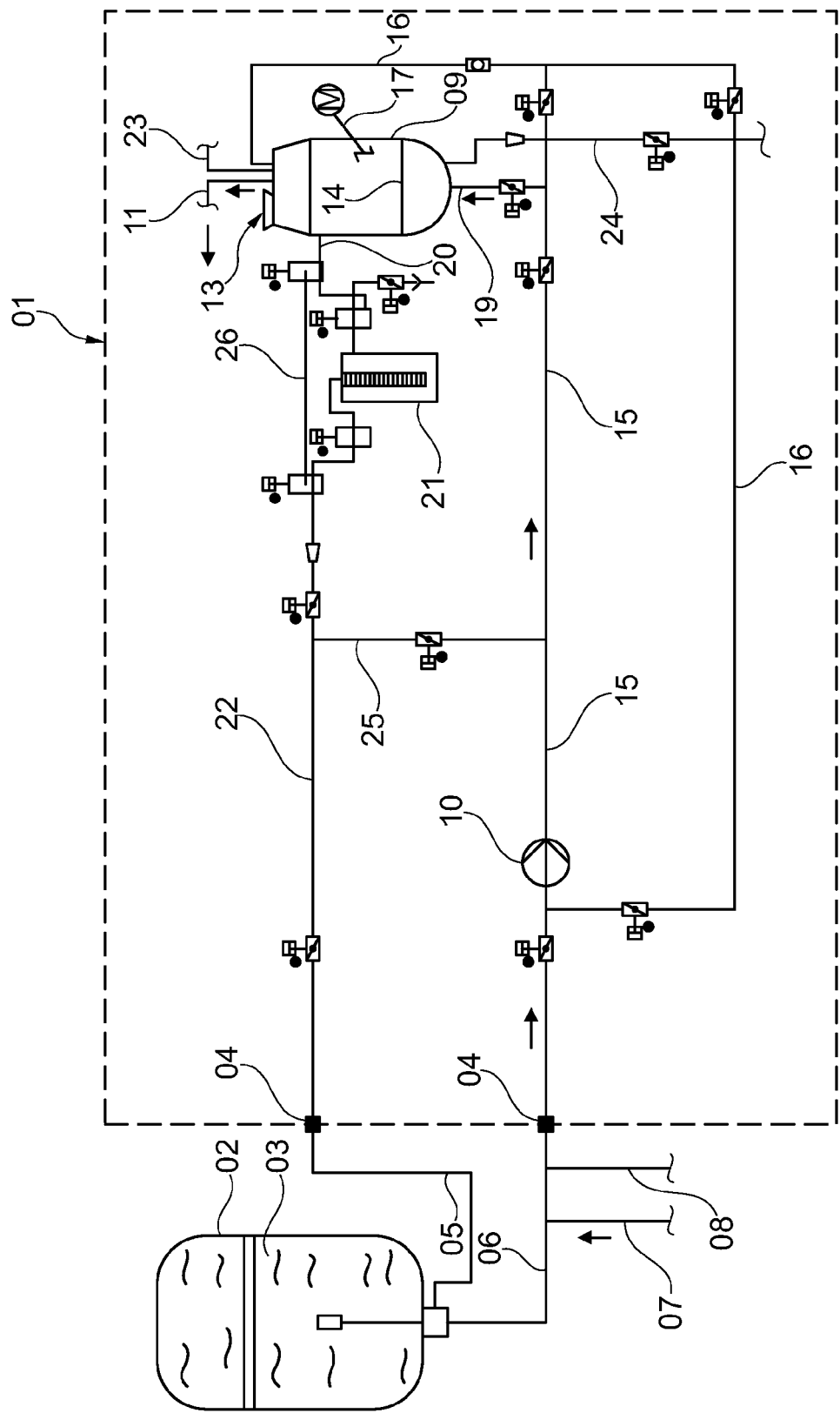
FIG. 1 shows a device for extracting aroma substances at the beginning of the process.

FIG. 1 shows a device 01 according to the invention for extracting aroma substances from vegetable aroma carriers, namely hop pellets, into a brewing liquid, namely beer. The device is illustrated merely schematically in FIG. 1, only the components of the device 01 that are necessary for the understanding of the invention being illustrated. The device 01 can preferably be mounted on a mobile frame so as to be able to move the device 01 in a mobile manner to different locations of use.

In the variant of use illustrated in FIG. 1, the device 01 is used in a fermentation or storage cellar for dry-hopping beer. First, the device 01 is rolled to a fermentation tank 02, in which matured beer or beer 03 that is still fermenting is stored. The fermentation tank 02 is illustrated only in a miniaturized manner in FIG. 1. Via connection couplings 04, the device 01 is connected to the inlet 05 and to the outlet 06 of the fermentation tank 02. Moreover, a $CO_2$ supply duct 07 and a brewing water supply duct 08 end in the outlet 06 of the fermentation tank 02. Alternatively, the ducts 07 and 08 can also be guided directly into the device 01. This increases only the number of connections from the brewery into the device 01.

In its core, the device 01 consists of a fluidized bed extractor 09, through which different media can be pumped from various pipes and different check valves by being driven via a controllable feed pump 10. Before the actual process for extraction begins, first, $CO_2$ from the $CO_2$ supply duct 07 is fed into the device 01, and the different pipes and the fluidized bed extractor 09 are flooded with $CO_2$, as illustrated in FIG. 1. At the highest point, the $CO_2$ can escape from the device 01 via a gas discharge 11.

Figure 2:
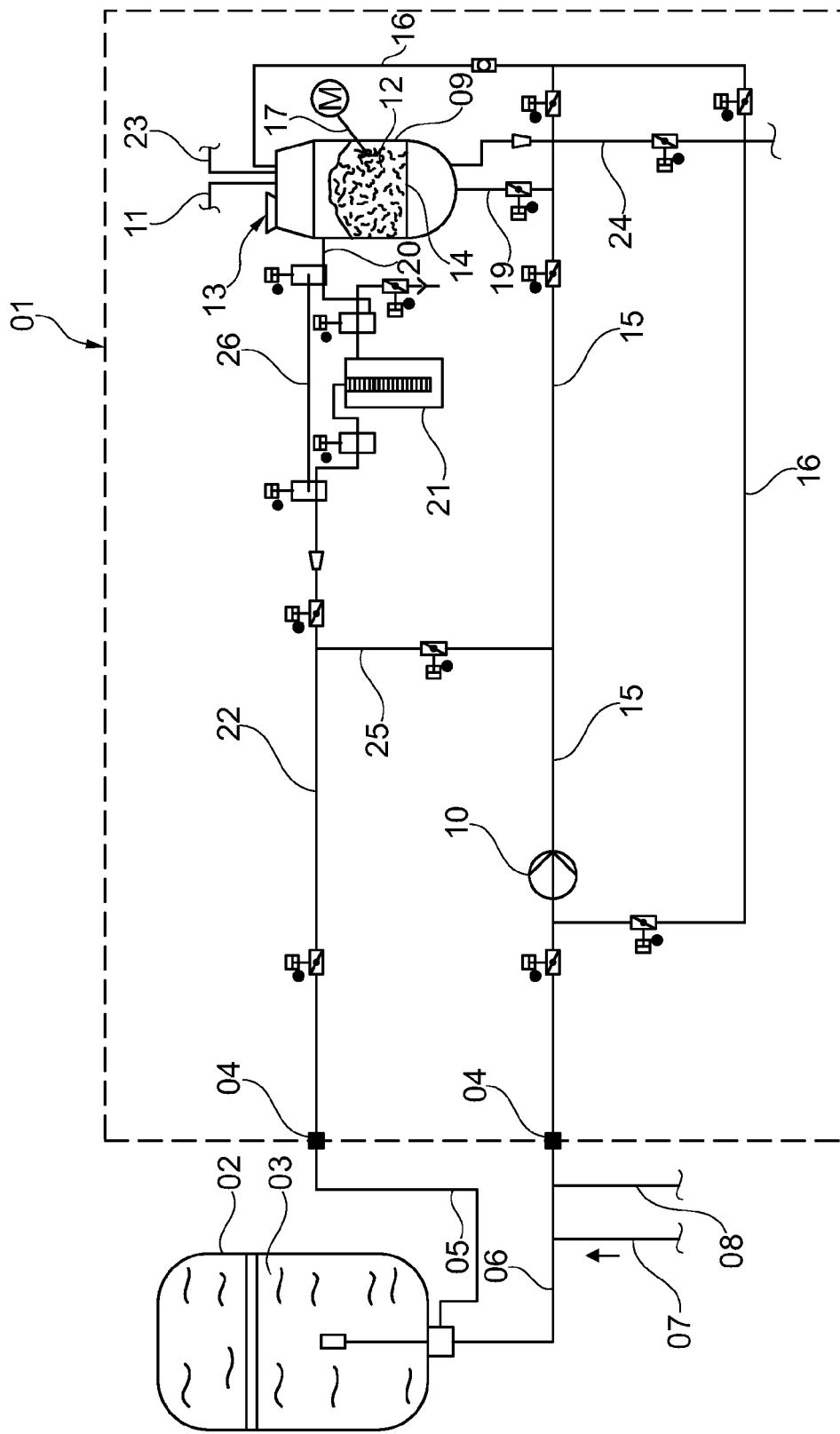
FIG. 2 shows the device according to FIG. 1 during filling of the fluidized bed extractor with hop pellets.
Figure 3:
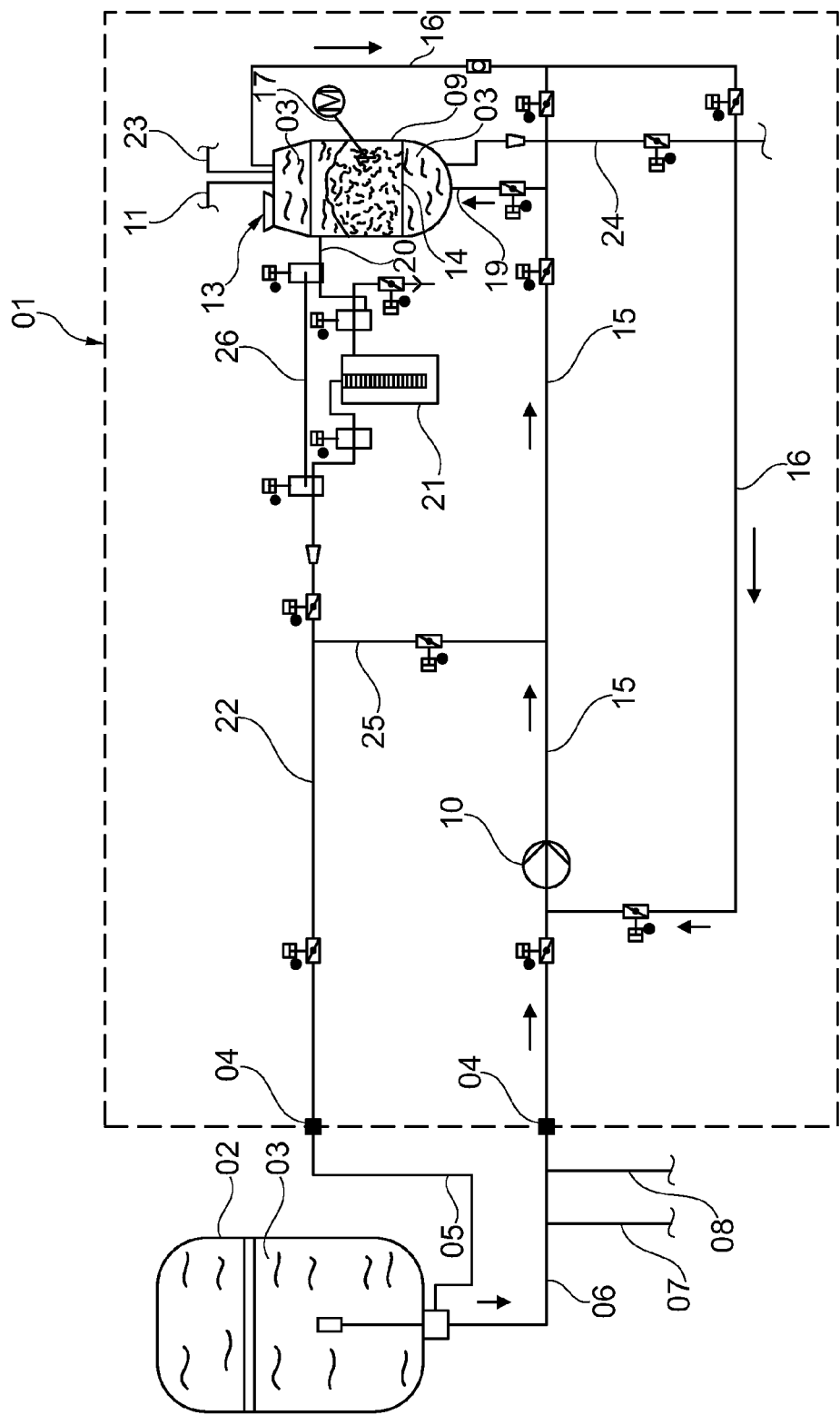
FIG. 3 shows the device according to FIG. 2 during filling of the fluidized bed extractor with beer.

As soon as the device 01 is flooded with $CO_2$, first, the fluidized bed extractor is filled with dry hop pellets 12, as illustrated in FIG. 2. Filling takes place via a filling opening 13. When being filled in, the hop pellets come to rest on a permeable support element 14, namely a sieve bottom. The size of the sieve openings is selected in such a manner that the hop pellets 12 cannot drop through the sieve openings. Yet at the same time, liquids can easily flow through the support element 14. The order of the process steps of flooding the system with $CO_2$ and of filling the extractor with hop pellets can be switched. This does not change the method according to the invention in any way.

After filling-in of the hop pellets, the device 01 and in particular the fluidized bed extractor 09 is filled with beer 03. To this end, the beer is pumped by operation of the feed pump 10 out of the fermentation tank 02 through the outlet 06 and the feed line 15 into the fluidized bed extractor 09 from below until the latter is completely filled with beer and the beer flows back to the feed line 15 via a circulation duct 16. The gas contained in the system is removed from the device via the discharge 11.

Figure 4:
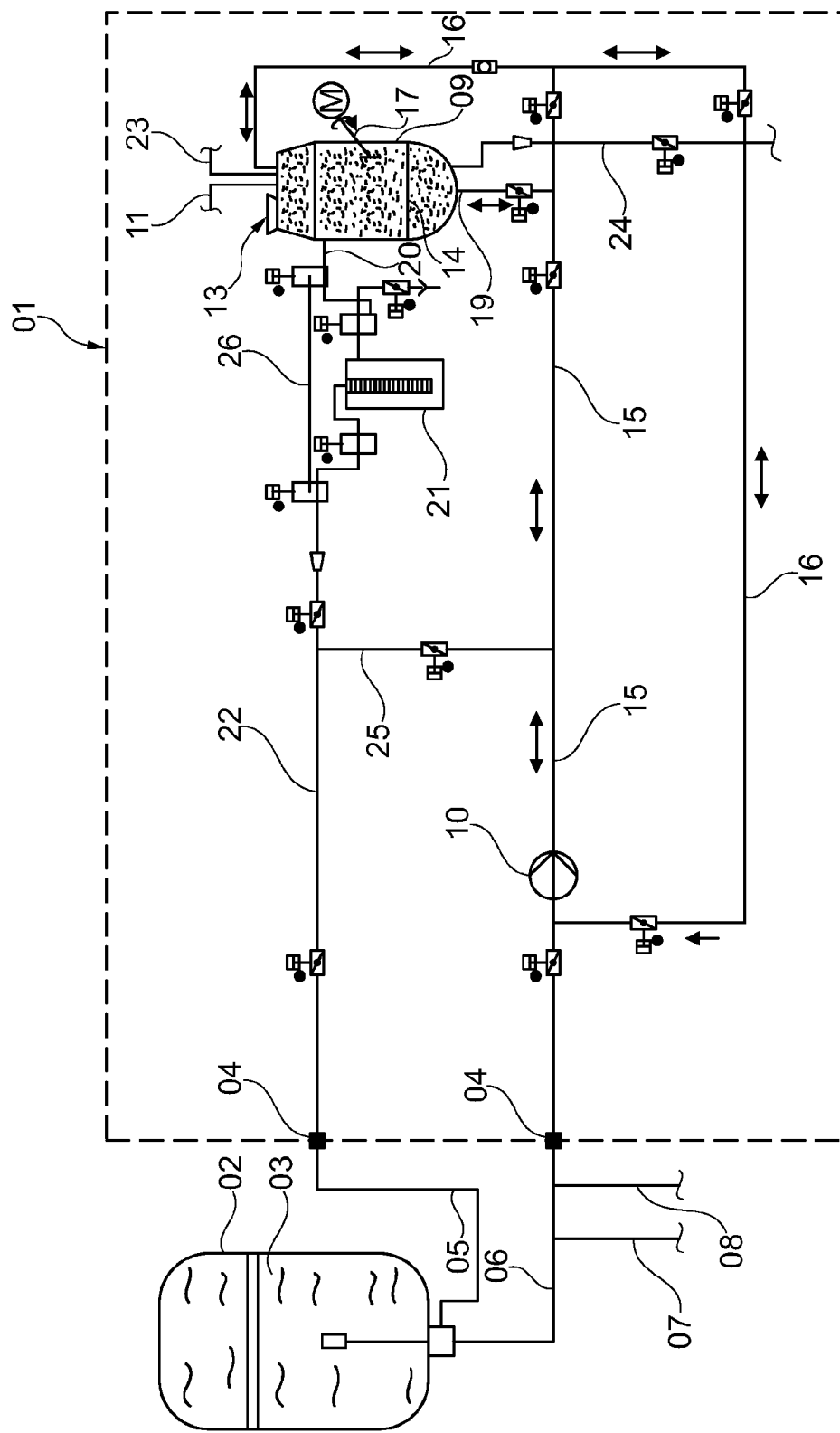
FIG. 4 shows the device according to FIG. 3 during formation of the suspension of beer and hop particles.

Once the fluidized bed extractor 09 and the circulation duct 16 are completely flooded with beer, the outlet 06 of the fermentation tank 02 is disconnected from the device 01 by switching a valve and, as illustrated in FIG. 4, the beer is pumped in a circulating manner through the feed line 15 and the circulation duct 16 by the feed pump 10. By circulation-pumping the beer, the pressed hop pellets dissolve in the fluidized bed extractor 09 and a fine suspension of hop particles and beer is formed. To facilitate formation of the suspension, the feeding direction of the feed pump 10 is repeatedly switched and the beer is thus fed through the fluidized bed extractor 09 in alternating feeding directions. Moreover, formation of the suspension can be facilitated by driving a mixing means 17, namely a jet mixer or a shear stirrer.

Figure 5:
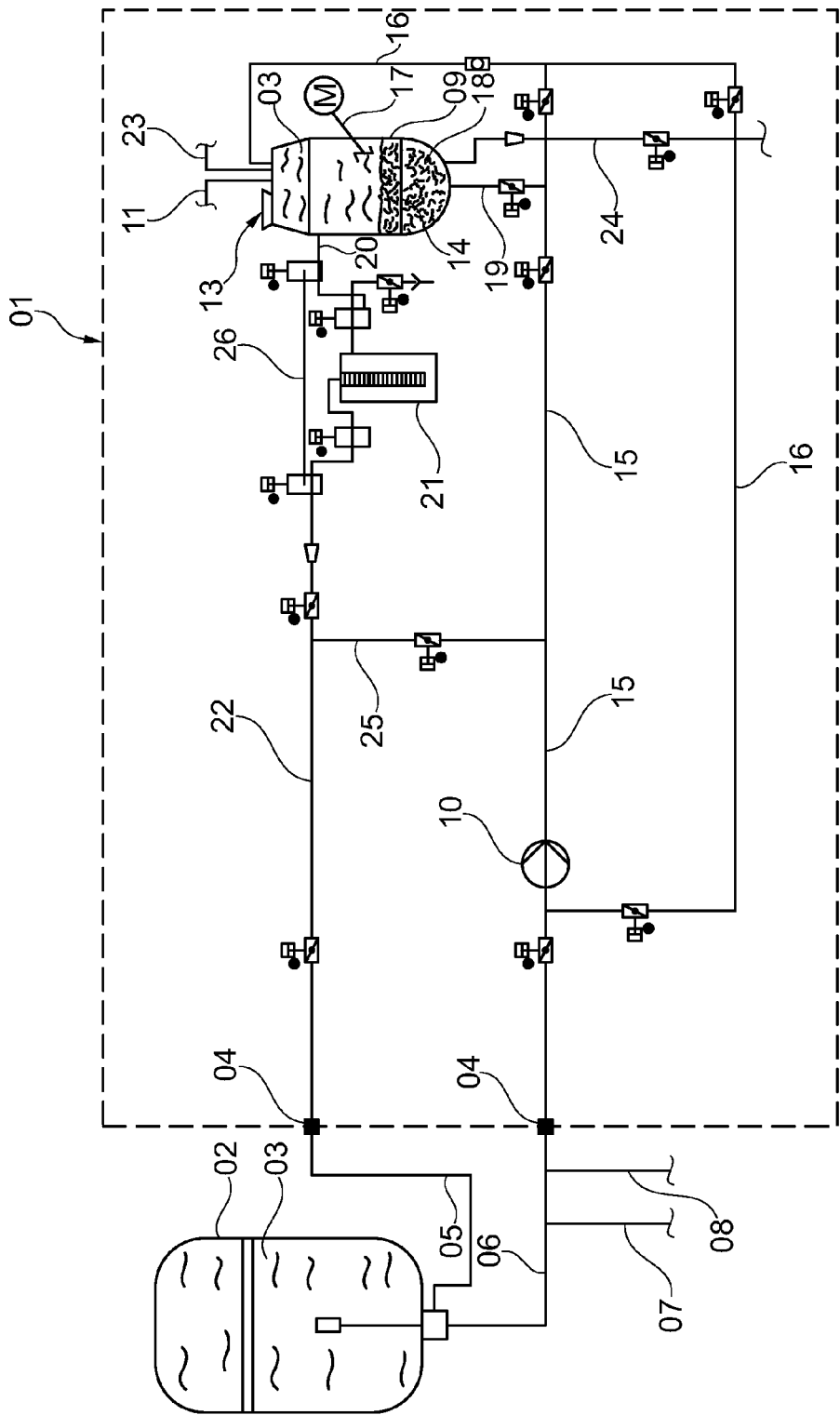
FIG. 5 shows the device according to FIG. 4 during sedimentation of the suspension of beer and hop particles at the bottom of the fluidized bed extractor.

As soon as the hop pellets 12 are completely crushed or broken up and the hop particles contained in the hop pellets form a finely distributed suspension together with the beer 03, the feed pump 10 is briefly turned off, as illustrated in FIG. 5, so that a suspension bed 18 can form at the bottom of the fluidized bed extractor 09. The height of the suspension bed 18 should not exceed half of the height of the fluidized bed extractor 09.

Figure 6:
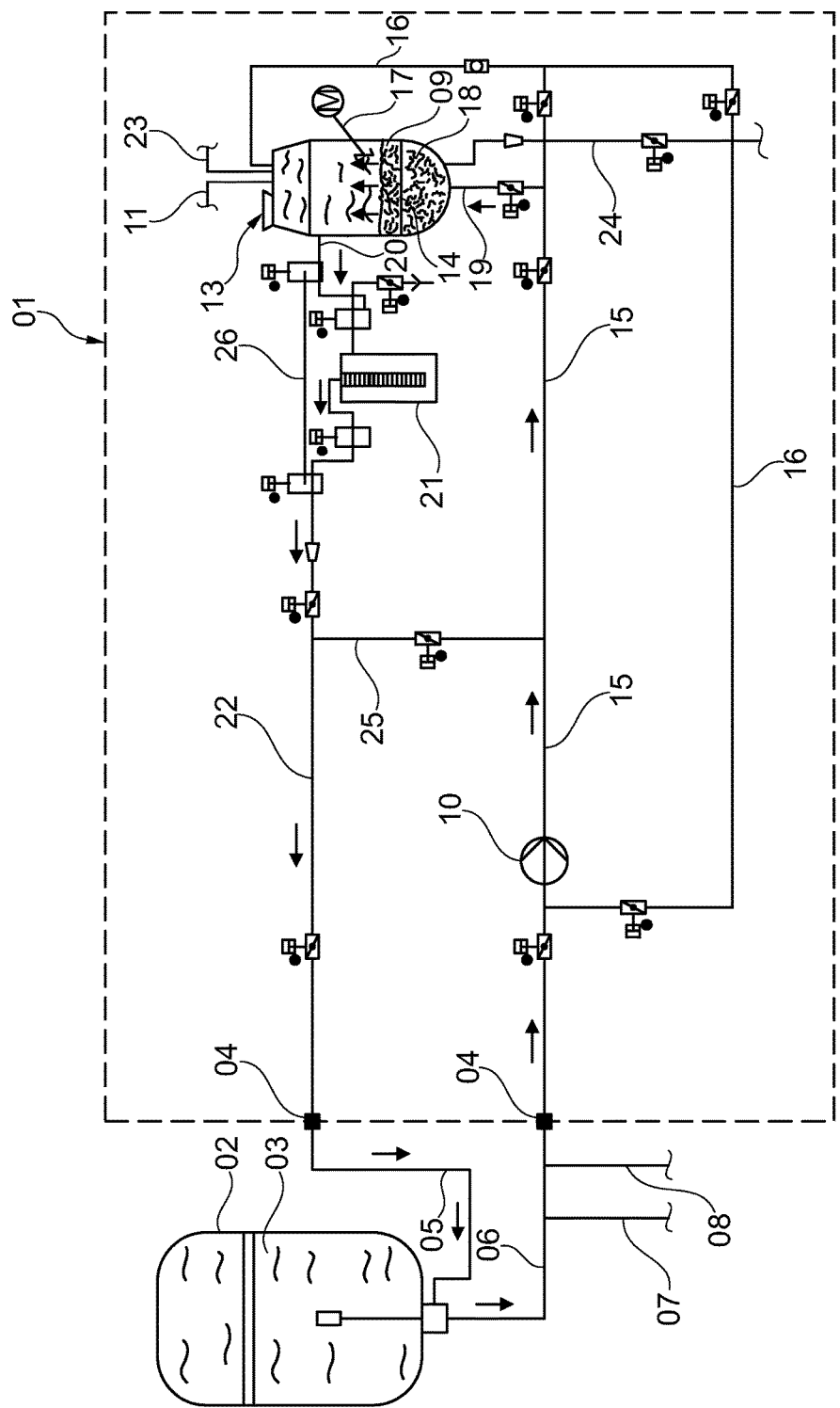
FIG. 6 shows the device according to FIG. 5 while brewing liquid is pumped through the fluidized bed extractor to release the soluble aroma substances into the beer.

Once the suspension bed 18 has sufficiently settled, the circulation duct 16 is closed and the outlet 06 of the fermentation tank 02 is connected to the device 01 again by opening the corresponding valve. Subsequently, as illustrated in FIG. 6, the beer 03 is pumped from the fermentation tank 02 through the feed line 15 and the inlet 19 into the fluidized bed extractor 09 from below by operation of the feed pump 10. The beer flows vertically upward through the suspension bed 18 and flows toward the outlet 20 of the fluidized bed extractor 09. The feeding speed of the feed pump 10 is selected such that the average vertical flow speed of the beer 03 in the fluidized bed extractor 09 is lower than the average vertical sedimentation speed of the hop particles. With this speed difference, it is achieved that the insoluble solid particles settle at the bottom of the fluidized bed extractor 09 and together form the suspension bed 18. Only very fine solid particles can be transported out of the fluidized bed extractor 09 via the outlet 20 together with the beer 03. To remove these very fine solid particles, the beer subsequently flows through a fine filter device 21, namely a backflushable corner pipe filter. Subsequently, the beer flows toward the inlet 05 of the fermentation tank 02 via the return line 22 of the device 01 and thus returns into the fermentation tank 02. Depending on the desired degree of filtration, the fine filter device 21 may also be bypassed entirely or in part by way of a bypass duct 26. This decision is up to the user.

If it is possible within the parameters of the process, the fine filter device 21 may also be entirely omitted. The fine solid particles would then reach the fermentation tank 02 and would have to be removed from the beer 03 in another way. This decision, too, has to be made by the user in consideration of the intended use.

The circulation of the beer 03 from the fermentation tank 02 as illustrated in FIG. 6 serves to leach the aroma substances from the hop particles contained in the suspension bed 18, sufficient separation of the liquid and solid components of the suspension being provided at the same time by the flow characteristics of the fluidized bed extractor 09.

In general, the process steps for forming the suspension, as illustrated in FIG. 4, and for leaching, as illustrated in FIG. 6, may also be repeated several times so as to further increase leaching by repeatedly whirling up the suspension bed 18. The process step according to FIG. 5 for forming the suspension bed is then performed in each case between the respective process steps for forming the suspension. This process can further increase the degree of leaching.

Figure 7:
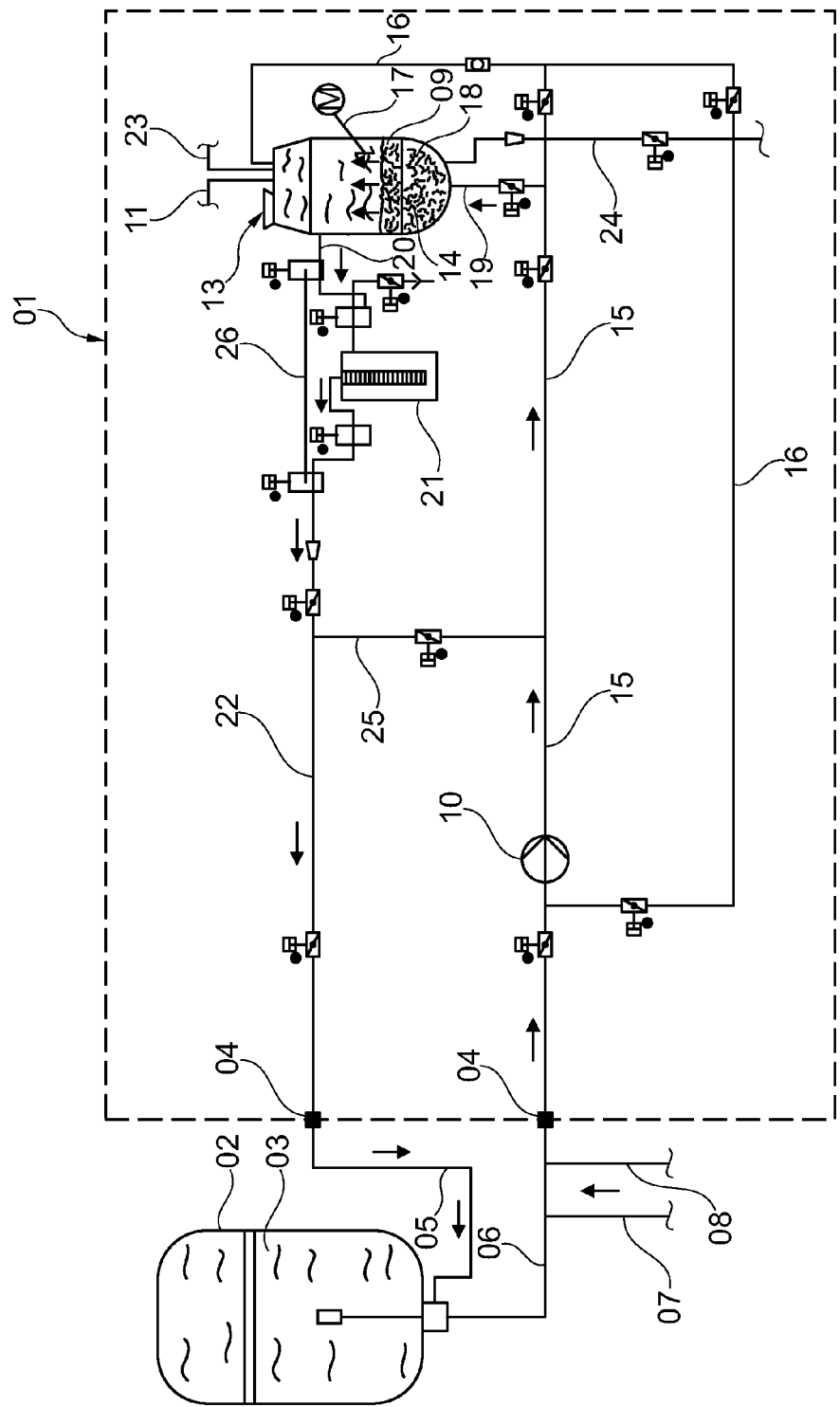
FIG. 7 shows the device according to FIG. 6 during emptying of the fluidized bed extractor.

As soon as a sufficient degree of leaching of the hop particles is reached, the outlet 06 of the fermentation tank 02 is closed. Then, as illustrated in FIG. 7, brewing water from the brewing water supply duct 08 is pressed into the feed line 15 so as to press the beer remaining in the device 01 back into the fermentation tank 02 via the return line 22 and the inlet 05 of the fermentation tank 02.

Figure 8:
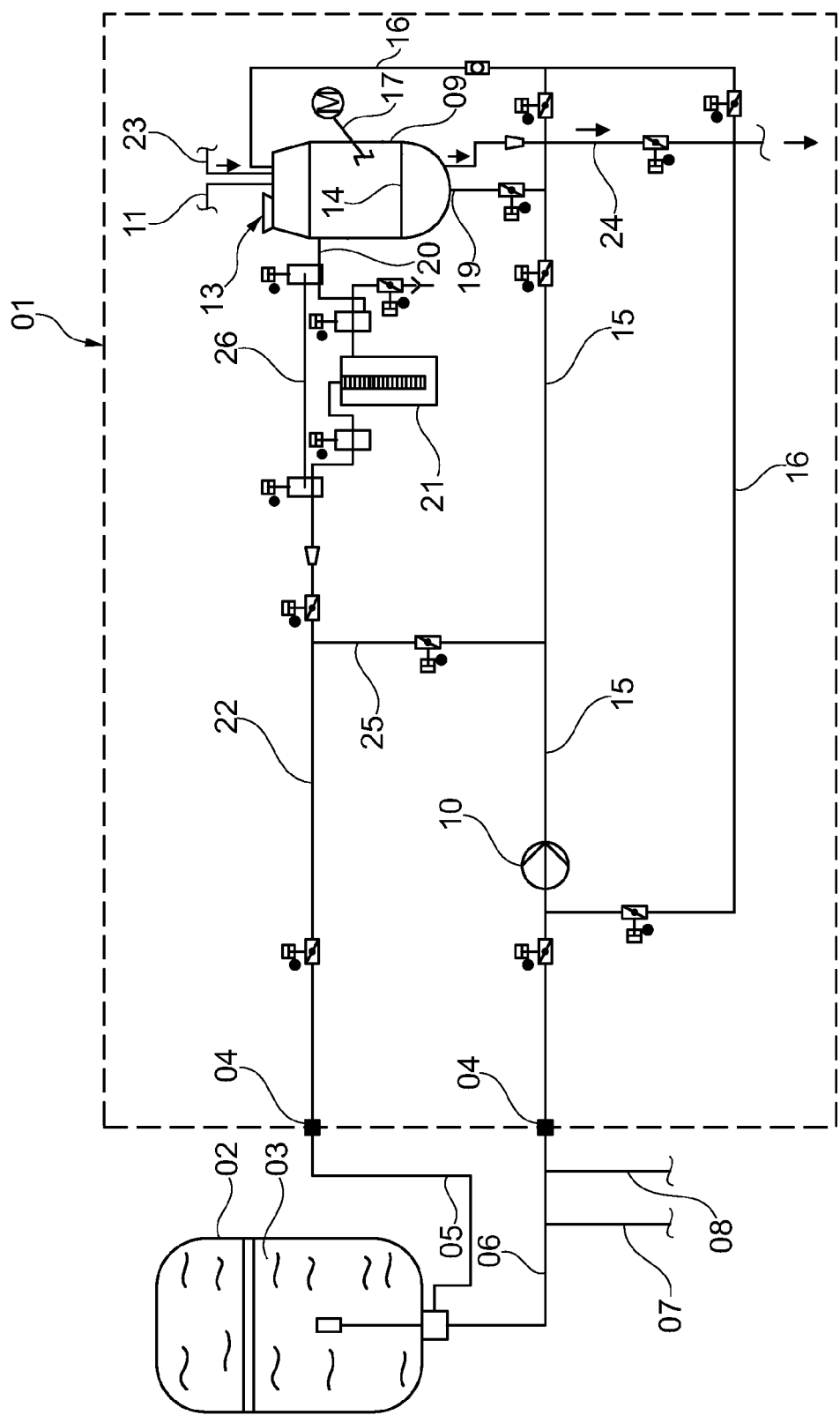
FIG. 8 shows the device according to FIG. 7 during removal of the solid suspension from the fluidized bed extractor.

Once the beer 03 has been completely removed from the device 01, a suitable cleaning fluid, preferably brewing water 08, is pressed into the fluidized bed extractor 09 via a duct 23, as illustrated in FIG. 8, and the remaining residual suspension is discharged via an outlet duct 24 in the direction of a drain duct (not illustrated). Subsequently, the entire installation can be machine-cleaned by means of a CIP cleaning device not illustrated in the drawing.

Figure 9:
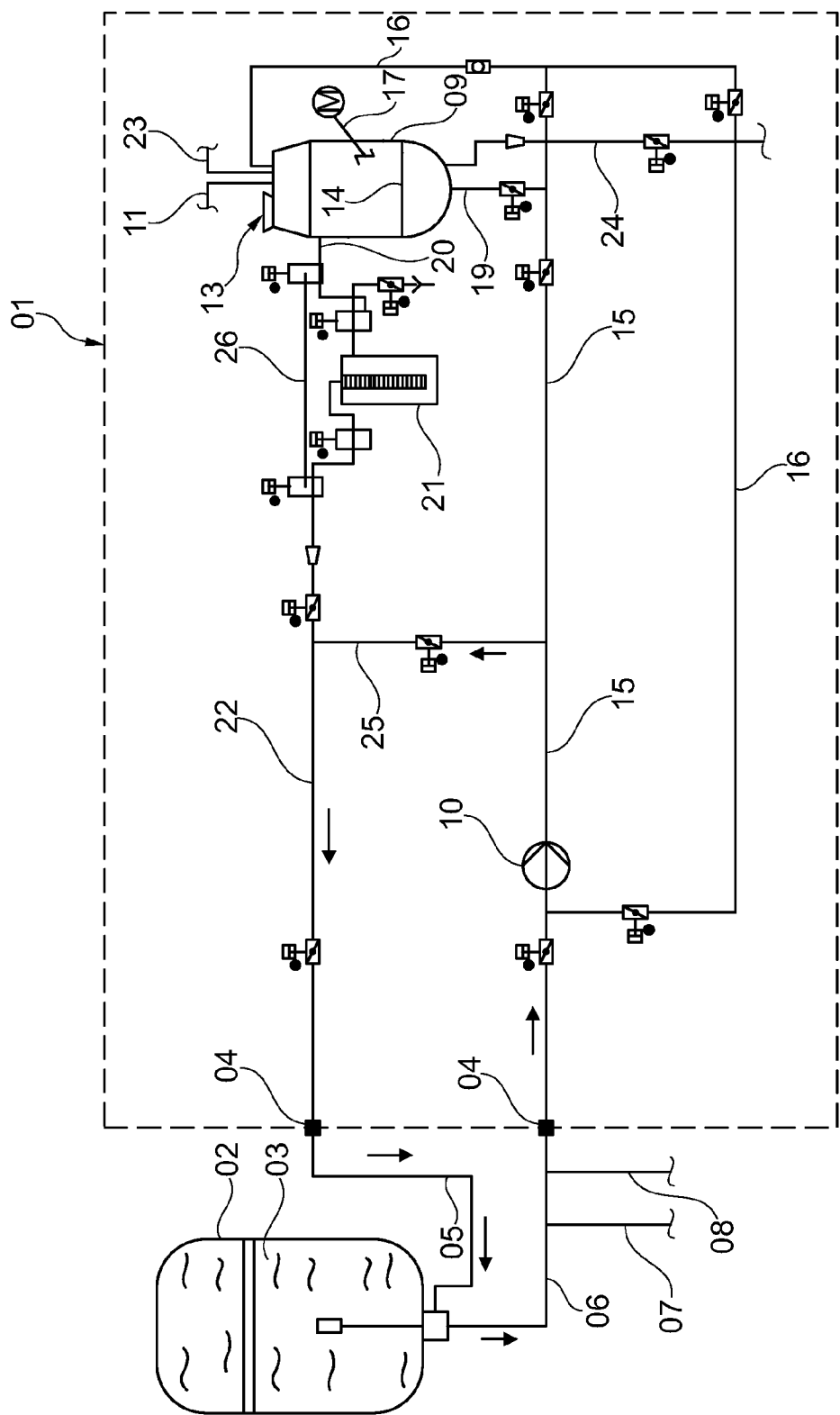
FIG. 9 shows the device according to FIG. 8 during circulation pumping of the beer to homogenize the aroma substance concentration.

To homogenize the concentration of the aroma substances dissolved in the beer 03, the beer 03 can be pumped through a circulation duct 25 and can be mixed by operation of the feed pump 10 in the fermentation tank 02, as illustrated in FIG. 9.

The invention claimed is:

1. A device for extracting aroma substances from vegetable aroma carriers into a brewing liquid, said device comprising:

a fermentation tank having a fermentation tank inlet and a fermentation tank outlet;

a processing device having a brewing liquid inlet in fluid communication with the fermentation tank inlet, a brewing liquid outlet in fluid communication with the fermentation tank outlet, and a filling opening; the processing device adapted to receive hop pellets though the filling opening and the brewing liquid from the fermentation tank through the tank inlet and to form a fluidized bed extractor accommodating a suspension bed formed by a suspension including the brewing liquid and solid particles contained in the vegetable aroma carriers; and a feed pump adapted to pump the brewing liquid from the fermentation tank outlet through the brewing liquid inlet of the processing device, through the suspension bed of the fluidized bed extractor, and out of the brewing liquid outlet to the fermentation tank inlet, wherein the feeding speed of the feed pump is set to a value at which a flow speed of the brewing liquid in the fluidized bed extractor is lower than an average sedimentation speed of the solid particles in the fluidized bed extractor, wherein the brewing liquid is pumped out of the processing device, the processing device both dissolving fluids and separating fluids from the solid particles through the suspension bed.

2. The device according to claim 1, wherein the feeding direction of the feed pump is switchable, and wherein the hop pellets can be broken up by switching the feeding direction of the brewing liquid in the fluidized bed extractor, forming the suspension of the brewing liquid and the solid particles.

3. The device according to claim 1, in which a drivable mixer arranged in the fluidized bed extractor breaks up the vegetable aroma carriers or mixes the suspension.

4. The device according to claim 1, in which a permeable supporting element having openings sized to prevent hop pellets from dropping through the openings is arranged in the fluidized bed extractor on which the vegetable aroma carriers can be deposited during and after filling of the fluidized bed extractor with the vegetable aroma carriers and prior to forming the suspension by adding the brewing liquid.

5. The device according to claim 1, further comprising a fine filter connected between the brewing liquids outlet and the fermentation tank inlet, the fine filter adapted to separates fine components of the solid particles from the brewing liquid.

6. The device according to claim 5, in which parallel to the fine filter, a bypass duct is provided by way of which the fine filter can be bypassed.

7. The device according to claim 1, in which the feeding rate of the feed pump can be controlled.

8. The device according to claim 3, in which said drivable mixer is a jet mixer or a shear stirrer.

* * * * *

UNITED STATES PATENT AND TRADEMARK OFFICE
CERTIFICATE OF CORRECTION

PATENT NO. : 10,196,594 B2
APPLICATION NO. : 14/940911
DATED : February 5, 2019
INVENTOR(S) : Patrick Bahns et al.

Page 1 of 1

It is certified that error appears in the above-identified patent and that said Letters Patent is hereby corrected as shown below:

In the Claims

Column 8, Claim 1, Line 23, "the tank inlet" should be --the brewing liquid inlet--.

Signed and Sealed this
Ninth Day of April, 2019

Andrei Iancu
*Director of the United States Patent and Trademark Office*